Figure 1B:
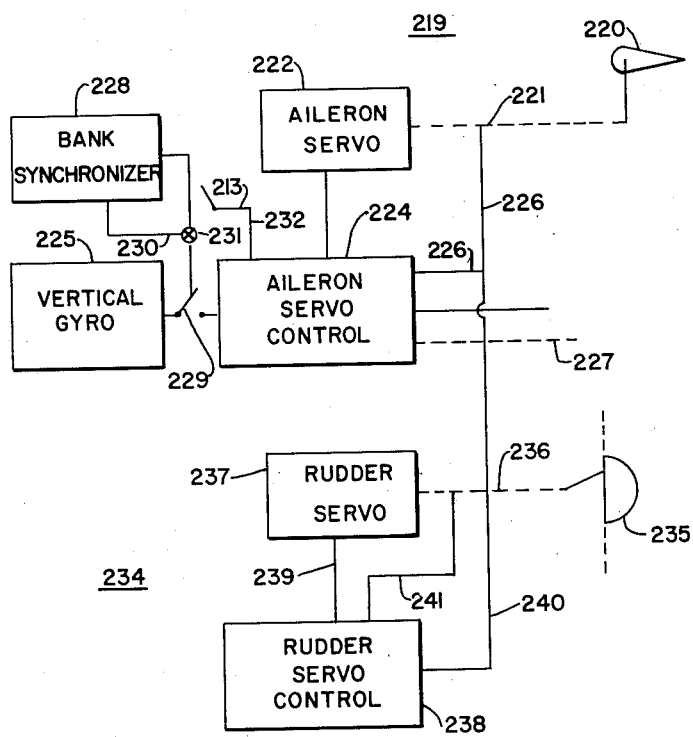

Sept. 18, 1962    B. H. CISCEL    3,054,580
AUTOMATIC PILOTS
Filed June 13, 1957    3 Sheets-Sheet 1
Fig. IA
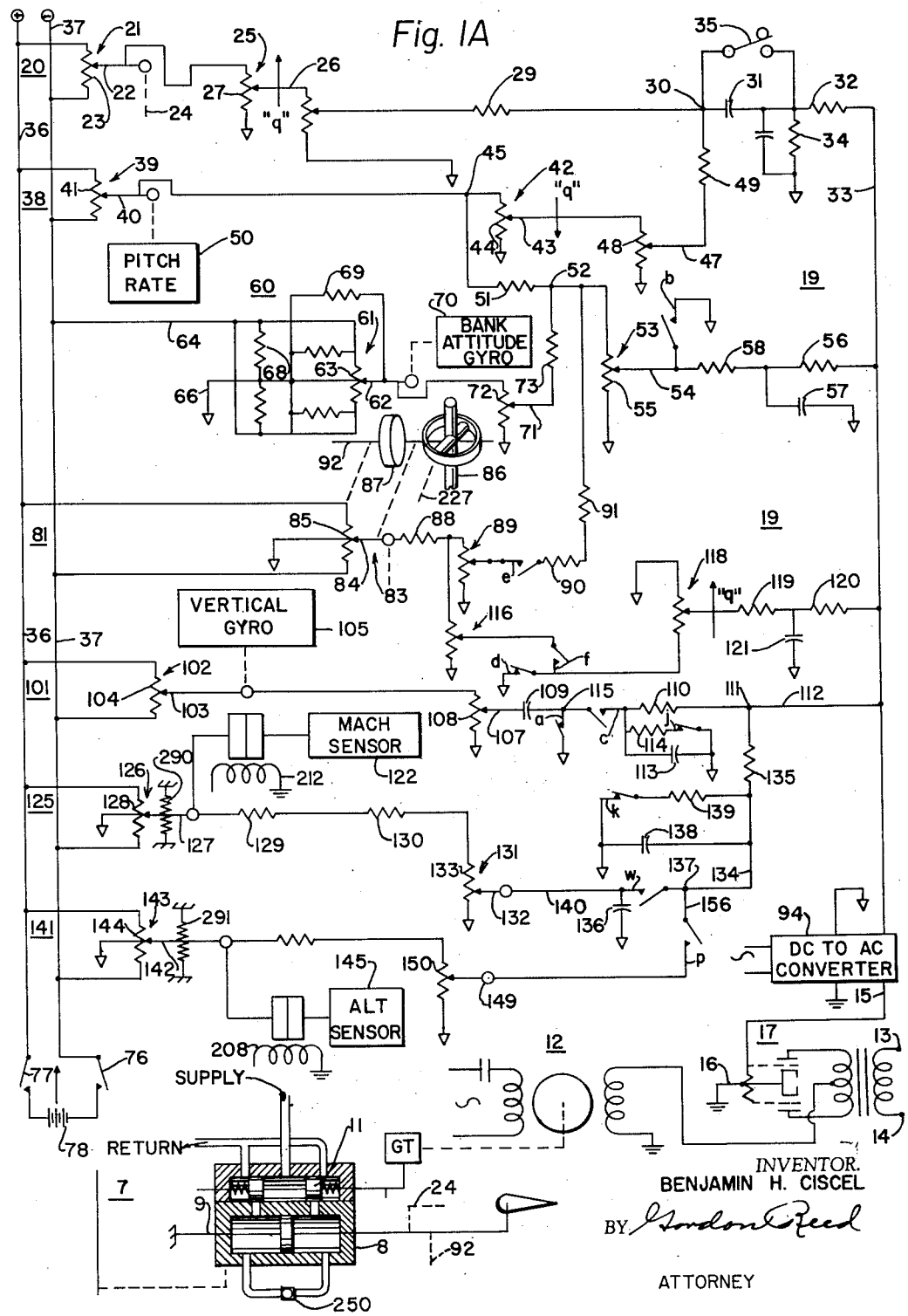
INVENTOR.
BENJAMIN H. CISCEL
BY Gordon Reed
ATTORNEY Sept. 18, 1962  B. H. CISCEL  3,054,580
AUTOMATIC PILOTS
Filed June 13, 1957  3 Sheets-Sheet 2

INVENTOR.
BENJAMIN H. CISCEL
BY
ATTORNEY

INVENTOR.
BENJAMIN H. CISCEL
BY Gordon Reed
ATTORNEY

United States Patent Office 3,054,580
Patented Sept. 18, 1962

3,054,580
AUTOMATIC PILOTS
Benjamin H. Ciscel, Altadena, Calif., assignor to Minneapolis-Honeywell Regulator Company, Minneapolis, Minn., a corporation of Delaware
Filed June 13, 1957, Ser. No. 665,434
28 Claims. (Cl. 244—77)

This invention relates to automatic condition control apparatus and particularly to automatic pilots for a dirigible craft such as aircraft which maintain conditions such as attitude, heading, altitude, or airspeed at a desired value. While such an automatic pilot for an aircraft therefore in its broadest sense controls the craft about its turn, roll, and pitch axes, the present invention is primarily concerned with the portion of the automatic pilot which controls the aircraft about the pitch axis. The type of automatic pilot with which the invention has been specifically applied includes the conventional control stick of the airplane modified so that control signals may be introduced in the roll and pitch axes therefrom.

One object of the present invention is to provide altitude control of an aircraft which may be combined with an attitude control whereby the craft may be maintained at a constant altitude as well as at a predetermined attitude and wherein steady state or long term departures of attitude of the craft from the desired attitude may be effected to maintain constant altitude of the craft.

A further object of the present invention is to utilize pressure sensitive devices as a control for maintaining flight conditions, involving pressures at a predetermined value, which control may be combined with an attitude control device whereby the craft may be maintained at a constant attitude as well as at a constant pressure and wherein long term or steady state departures in attitude of the craft from the predetermined position may be effected to maintain a constant pressure of the flight conditions without opposition from this attitude device.

A further object of this invention is to utilize during banked turns of the aircraft, the response of a vertical gyroscope about its roll axis in one mode and the response of the gyroscope about its pitch axis in another mode to control the angle of attack of the aircraft in such turns.

A further object of this invention is to stabilize the aircraft about its pitch axis from a pitch rate gyroscope and a lag device having a time constant substantially greater than that of the aircraft whereby short period attitude stabilization of the craft is provided and wherein during constant altitude control alternative attitude control about the pitch axis is provided by an attitude gyroscope in an arrangement transmitting merely transient attitude departures to craft control.

A further object of this invention is to utilize an attitude gyroscope means responsive to only transient attitude changes along with an altitude controller while in a banked turn to permit steady state changes in attitude while maintaining constant altitude.

Still another object of the present invention is to provide an improved combined pitch attitude and altitude control for the aircraft including means for modifying the altitude control thereby transmitting merely transient disturbances in attitude during changes in altitude.

Figure 2:
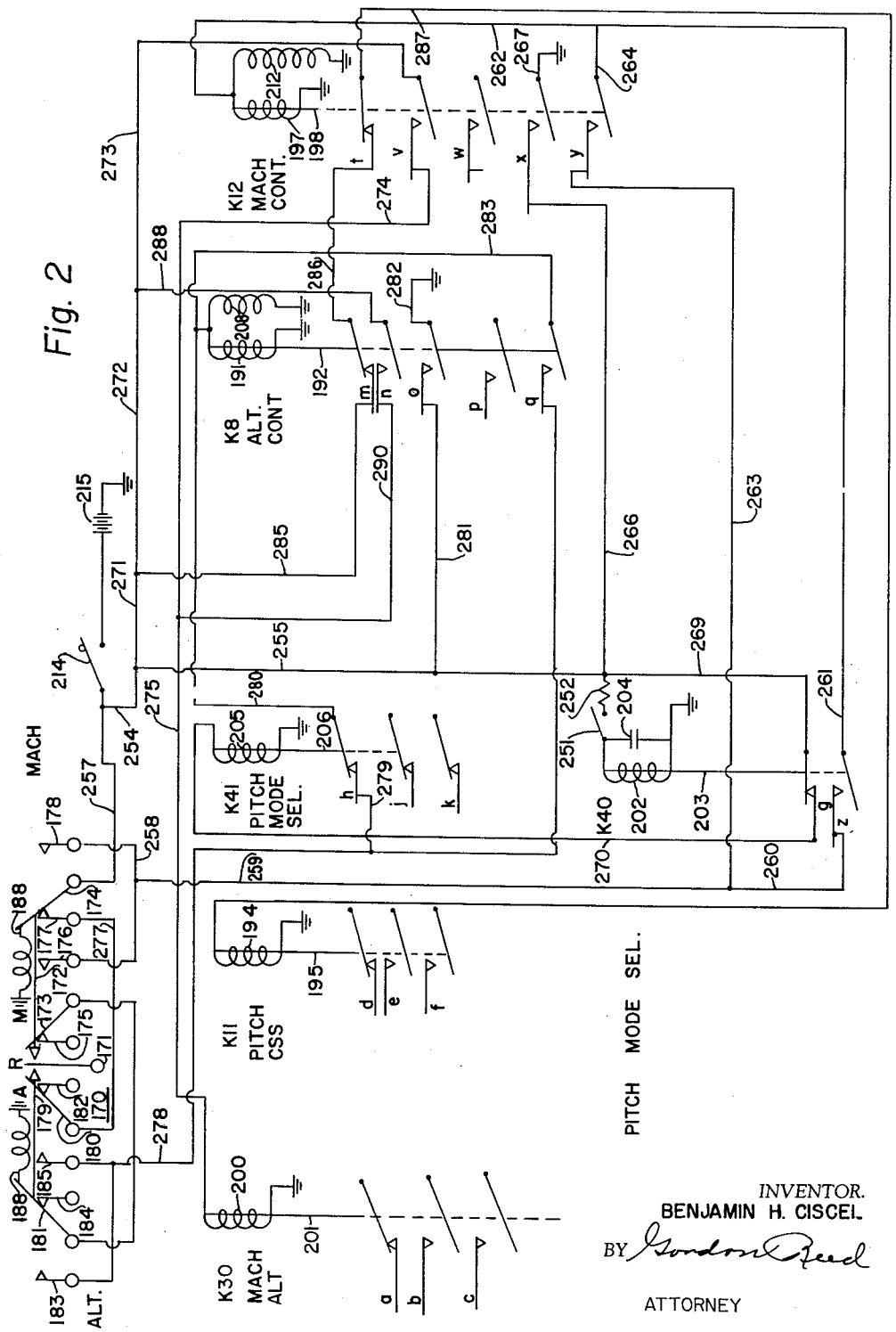

Further objects and advantages of the present invention will be apparent from the accompanying specification and drawings in which;

FIGURES 1A and 1B together show one schematic embodiment of the pitch axis control system of the invention; and FIGURE 2 shows an interlock relay arrangement in conjunction with a selector for ascertaining the mode or configuration of the pitch channel control system.

According to the invention, an aircraft is provided with an automatic pilot that positions the aileron, rudder and elevator surfaces to maintain the aircraft in a desired heading and in a desired attitude about its roll or pitch axes. The autopilot includes a manually operable control stick in the form of the conventional aircraft control stick modified to include means to provide roll attitude and pitch attitude control signals. Additionally, a three position selector is provided to determine by its position, among several selective positions, whether the autopilot will function in a normal, constant altitude, or constant Mach configuration or mode.

When the selector is in the normal mode position, the control stick may be operated to control craft attitude either about its roll or pitch axes. When desired, banked turns may be effected through the control stick operation, and the vertical gyroscope in sensing the banked attitude of the aircraft will operate to provide in accordance with the magnitude of the bank angle an up elevator signal as an aid to preventing loss of altitude in the banked turn. Pitch attitude stabilization is provided through a lagged pitch rate control circuit.

When the selector is in either the altitude or Mach mode position however and banked turns are effected through the control stick, a vertical gyroscope rather than the lagged pitch rate circuit is arranged to automatically operate attitude changing means to provide short period corrections to maintain craft pitch attitude. Thus the vertical gyroscope is arranged so that steady state or long term departures of pitch attitude of the craft from a predetermined position have no control effect on the pitch attitude changing means, and an altitude sensor or Mach sensor may operate the attitude changing means to effect changes in the angle of attack of the aircraft and thus its pitch attitude in order to maintain either constant altitude or constant Mach.

During such banked turns, the vertical gyroscope operated potentiometer responsive to bank attitudes of the craft and previously used to provide an up elevator signal is not utilized since its signal is of a single phase tending to apply up elevator. In altitude control such signal may be desirably effective but in some instances during Mach control where the aircraft tends to lose speed during a banked turn a down elevator signal rather than an up elevator signal to maintain constant Mach may be necessary. Since the actual signal from the up elevator signal generator would be an up elevator signal, it is evident that the type of signal is unsuited for constant Mach control. In the following detailed description, means providing the selected method of control will be described.

The present invention is an improvement in the type of automatic pilot disclosed in a prior application of Corles M. Perkins, Serial No. 553,131, filed December 14, 1955. Such type of automatic pilot is designed primarily to accomplish automatic flight control based on control of flight path rather than on stabilization of attitude. This is accomplished also in the present instance with respect to the elevator channel by placing primary emphasis on outer loop control such as Mach number, altitude, or similar flight path control. All attitude maneuverability in roll and pitch while on autopilot control is afforded by control stick steering. Forces applied to the control stick command pitching rates or banking rates of the aircraft, in the particular channel involved herein.

Early efforts to secure precise altitude control in a system as disclosed in the Perkins application were hindered in banked turns because of the high lagged pitch rate gain control in the elevator channel and comparatively low altitude control gain therein. To actually maintain constant altitude, the lagged pitch rate signal (which apparently indicated a pitching up action of the craft) had to be cancelled by an up-elevator signal and this was quite difficult.

A new pitch axis configuration is provided herein utilizing a high-passed pitch attitude control for transmitting only short period pitch attitude signals to replace the lagged pitch rate signal in a banked turn as in the Perkins application. This arrangement permits the elimination of the up-elevator signal from the bank responsive gyroscope so that the up-elevator signal is retained only as an aid to the pilot on pitch control stick steering or normal mode. However, high-passed pitch attitude is the basic source for short term pitch attitude stabilization during altitude or Mach control modes.

Referring to FIGURES 1A and 1B, the autopilot system comprises three channels, aileron, rudder, and elevator, the latter appearing in FIGURE 1A, the first two appearing in FIGURE 1B. As more fully disclosed with respect to the elevator channel FIGURE 1A, each channel incorporates a parallel summing D.C. resistance bridge network. When a bridge network or signal system is unbalanced by an error signal either from a condition sensor or a selective command signal, the net unbalance is converted to an A.C. signal and supplied to a servo amplifier for that channel. After amplification in the amplifier the signal is supplied to a phase sensitive discriminator. In a preferred arrangement, the output of the discriminator is an alternating voltage supplied to a servomotor valve actuator or torque motor. The torque motor positions a control valve of a hydraulic servomotor which ports oil to the ram of the hydraulic servo so as to position its associated control surface. As the ram of the hydraulic servo moves, it provides a follow-up signal which is fed into the bridge to reduce the error signal to a level below the threshold of the amplifier.

Since such three channel automatic pilot has been more fully illustrated in the aforesaid prior Perkins application and since applicant's invention is primarily associated with the elevator channel and merely broadly involves the rudder and aileron channels, the latter two will be only generally referred to while the elevator channel will be described in detail.

In FIGURE 1A, a main servo mechanism or motor means 7 of the hydraulic type is arranged to position the pitch attitude control member of an aircraft. The hydraulic motor includes a cylinder assembly 8 connected to the attitude control member and a ram 9 which is fixed to the craft. Relative movement of the cylinder assembly 8 and ram 9 is provided by an operable valve 11 on displacement of the same from a normal position. The valve is of the spring centered type biased to an unoperated position wherein no fluid passes through the valve to the ram.

The displacement of the spring centered valve 11 from its normal or unoperated position is effected through a torque motor 12 connected thereto through a gear train. The torque motor 12 in turn is controlled or energized from an elevator servo amplifier 17. The torque motor may be of the electric type and the combination torque motor and amplifier may be similar to that disclosed in the U.S. patent to Beers 2,020,275 or to Taylor 2,388,350. Thus the motor 12 may be a capacitor type induction motor having a line winding energized from an A.C. supply and an amplifier energized winding. The torque motor amplifier 17 is of the A.C. discriminator type and comprises A.C. power input terminals 13, 14 and A.C. signal voltage input terminals 15 and 16. The torque motor 12 exerts a torque in one or the other direction and tends to rotate in that direction depending upon the phase relationship of the A.C. voltages across power terminals 13, 14 relative to the signal voltage across signal input terminals 15, 16.

A resultant A.C. control signal voltage to the amplifier 17 is supplied by a balanceable network or control signal system 19 FIGURE 1A through a D.C. to A.C. converter 94. In other words D.C. control signals received by the inverter 94 are supplied as A.C. signals to the servo amplifier signal terminals 15, 16.

The inverter 94 may be of the vibrator type well known in the art and is operated from an A.C. voltage source derived from the line supplying amplifier terminals 13, 14.

The balanceable signal voltage network 19 is of the parallel summing D.C. signal voltage type. Network 19 comprises a plurality of signal generators or sources of control signals namely: a follow-up signal generator 20, a pitch rate gyro operated signal generator 38, a vertical gyro operated up elevator network 60, a manually operable pitch control stick steering signal generator 81, a vertical gyroscope operated pitch attitude signal generator 101; a Mach displacement signal generator 125; and an altitude displacement signal generator 141.

The signal generator 20 comprises a potentiometer 21 having an adjustable slider 22 and a potentiometer resistor 23 having one end connected to a positive voltage supply conductor 36 and its opposite end connected to a negative voltage supply conductor 37 which conductors are connected to a D.C. signal supply voltage source 78 by suitable switch means 76, 77. The slider 22 is positioned in either direction from the electrical center of potentiometer resistor 23 which has a potential corresponding to that of signal ground ($\nabla$) or midpoint of the signal source by an operating means 24 driven by servomotor 7, and the slider 22 is displaced from its electrical center in proportion to the displacement of the attitude control surface from its normal position. This normal position of the attitude control surface may be varied so that trim compensation may be provided. The signal in potentiometer slider 22 is modified by a voltage dividing potentiometer 25 having an adjustable slider 26 and resistor 27 having one end connected to slider 22 and its opposite end to signal ground. The slider 26 as indicated by the direction of the arrow associated therewith may be positioned in accordance with the increasing "$q$" pressure which is the differential between impact and static pressure to provide a gain control scheduled with "$q$." The slider 26 may be connected through a resistor 29, to a terminal 30. Terminal 30 is connected through a high-pass condenser 31 and summing resistor 32 to a summing conductor 33 of the network. The capacitor 31 may be by-passed by a single pole single throw switch 35. The junction of capacitor 31 and resistor 32 is connected by a resistor 34 to signal ground and capacitor 31 and resistor 34 comprise a network having approximately a 1 second time constant.

The pitch rate generator 38 comprises a potentiometer 39 having an adjustable slider 40 and a resistor 41 having its opposite ends connected to conductors 36 and 37. Slider 40 is positioned in either direction along resistor 41 in accordance with the pitch rate of the craft sensed or detected by a pitch rate gyroscope 50 of conventional type. The output signal voltage on slider 40 is supplied to a terminal 45. From terminal 45 extends a pitch rate to elevator input comprising a voltage dividing or gain potentiometer 42 having a slider 43 and a resistor 44. One end of resistor 44 is connected to terminal 45 and its opposite end to signal ground. Slider 43 may be positioned along resistor 44 in the direction indicated by the arrow in accordance with the increasing "$q$" pressure so that the amount of signal on slider 43 from potentiometer 39 decreases with increased value in "$q$". The output on slider 43 is modified by a pitch rate adjustment potentiometer having a slider 47 and resistor 48. One end of resistor 48 is connected to slider 43 and its opposite end to signal ground. A summing resistor 49 extends from slider 47 to terminal 30.

A lagged pitch rate circuit also extends from terminal 45. Specifically a resistor 51 connects terminal 45 to a second terminal 52. A lagged pitch rate adjustment potentiometer 53 having an adjustable tap 54 and resistor 55 has one end of resistor connected to terminal 52 and its opposite end to signal ground. Slider 54 which may be manually adjusted is connected by resistor 58 and resistor 56 in series to summing conductor 33. The junction of slider 54 and resistor 55 is connected to signal ground through an in contact *b* of a K-30 relay. The junction of resistors 55 and 56 is connected to signal ground through a capacitor arrangement 57.

The up elevator signal generator 60 which provides a single phase signal irrespective of the direction of the craft banked attitude comprise a potentiometer 61 having an adjustable slider 62 positioned in accordance with the bank attitude of the aircraft and a resistor 63. Both ends of resistor 63 are connected together and through a conductor 64 extend to supply conductor 37. A center tap of resistor 63 is connected to signal ground through a conductor 66. A resistor 68 is connected in parallel with resistor 63 and also has a center tap thereof connected to conductor 66. A resistor 69 connects slider 62 and the center tap of resistor 63. The opposed ends of resistor 63 are also connected through separate resistors to the center tap for protective purposes. Slider 62 is operated in accordance with the roll attitude of the aircraft by a gyroscope 70. Slider 62 is connected to a voltage dividing potentiometer comprising a slider 71 and resistor 72 connected between slider 62 and signal ground. A summing resistor 73 connects slider 71 with terminal 52.

Pitch control stick signal generator 81 comprises a potentiometer 83 having an adjustable slider 84 and a resistor 85. The opposite ends of resistor 85 are connected to supply conductors 36, 37. Slider 84 may be positioned in either direction from the electrical center of resistor 85 by the conventional control "stick" 86 of the airframe. The control stick may be of a conventional type suitably mounted for movement in a fore and aft and in a lateral plane. Upon movement of the control stick 86 in a fore and aft plane relative movement is supplied between the slider 84 and resistor 85. This relative displacement of slider 84 and resistor 85 is obtained by having the potentiometer resistor and slider constitute part of a control stick force transducer 87 similar to that disclosed in the aforesaid application of Corles M. Perkins or to that disclosed in the patent to Webb 2,451,263, FIGURE 1, where the inductive pickoff 13 in the arrangement of the patent is substituted for the potentiometer pickoff 83 in the present arrangement and the control stick is integral with the servo cylinder assembly 9 through the torque sensor 87, and member 92. Thus the signal developed in potentiometer 83 due to relative displacement of slider 84 and resistor 85 is proportional to the effort or force applied to the control stick 86. Upon release of the stick, the slider 84 and resistor 85 are returned to a null or no signal position by the restoring force in the transducer. Slider 84 is connected by resistor 88, voltage dividing potentiometer 89, and in contact *e* of relay K-11, resistor 90, 91 in series to terminal 52. A parallel circuit for the control stick extends from resistor 88, voltage dividing potentiometer 116, in contact *f* of the K-11 relay, *q* scheduled voltage divider 118, a lag circuit comprising resistors 119, 120, and capacitor 121 to conductor 33. Voltage divider 118 is additionally connected to signal ground through an out contact *d* of relay K-11.

Signal generator 101 comprises a pitch attitude potentiometer 102 having an adjustable slider 103 and resistor 104 having its opposite ends connected to conductors 36, 37. The slider 103 is positioned relative to the electrical center of resistor 104 by a vertical gyroscope 105 which senses the pitch attitude of the aircraft. The gyroscope is of the type well known in the art having a rotor with its spin axis perpendicular to the earth and responsive to changes in pitch attitude upon movement of the gyroscope about one axis and responsive to roll attitudes upon movement of the gyroscope relative to the craft about the longitudinal axis of the craft. The voltage on slider 103 is modified by a pitch attitude adjustment potentiometer having an adjustable slider or tap 107 and a resistor 108 extending between slider 103 and signal ground. Slider 107 is connected through a high passed condenser 109 to a terminal 115. Terminal 115 is connected to summing conductor 33 by an in contact *c* of a K-30 relay, summing resistor 110, conductor 112. Terminal 115 is connected to signal ground through an out contact *a* of the K-30 relay. The junction of contact *c* and resistor 110 is connected to signal ground through a capacitor 113. Capacitor 113 is shunted by a circuit comprising resistor 114 and out contact *j* of the K-41 relay.

The Mach displacement signal generator 125 comprises a potentiometer 126 having a slider 127 and resistor 128. The resistor 128 has its opposite ends connected across the supply conductors 36, 37. Slider 127 may be positioned relative to resistor 128 by a speed sensing device 122 which measures the velocity of the craft in terms of Mach number. The displacement of the slider 127 from the electrical center of resistor 128 is in accordance with the Mach of the craft. Slider 127 is connected through a resistor 129, resistor 130, to a Mach displacement adjustment potentiometer 131, comprising an adjustable slider 132 and resistor 133. Resistor 133 has one end connected to the end of resistor 130 remote from resistor 129. A conductor 140 connects slider 132 through in contact *w* of a K-12 relay to terminal 137. Terminal 137 is connected to terminal 111 by a conductor 134 and summing resistor 135. The junction of conductor 134 with resistor 135 is connected to ground through a capacitor 138 which in turn is by-passed or shunted by a circuit comprising resistor 139 and an out contact *k* of a K-41 relay. The junction of conductor 140 and in contact *w* of the K-12 relay is connected to signal ground through a capacitor means 136.

The Mach signal generator 125 includes a magnetic clutch winding 212 which will be energized to connect adjustable slider 127 with Mach sensor 122 when Mach control is to be applied, and recentering means 290 connected to slider 127 is effective on deenergizing winding 212.

The altitude displacement signal generator 141 which like Mach generator 125 comprises an outer loop control or flight path control comprises a potentiometer 143 having an adjustable slider 142 and resistor 144. The resistor 144 has its opposite ends connected to conductors 36, 37. The slider 143 may be operated relative to resistor 144 in accordance with the displacement of the craft from the altitude that it is desired to be maintained. A magnetic clutch having an operating winding 208 is interposed the potentiometer slider 142 and an altitude sensing device 145 which may be similar to that in the patent to Rossire 2,680,580. If desired, the altitude sensing arrangement may be of the force rebalance type such as that disclosed in Patent 2,820,188 filed January 29, 1951. The altitude displacement pickoff signal appearing on slider 142 is applied to an altitude displacement adjustment potentiometer having an adjustable slider 149 and a resistor 150 having one end connected to slider 142 and its opposite end to signal ground. Slider 149 is connected through an in contact *p* of a K-8 relay and a conductor 156 to terminal 137.

In the normal position of a function selector with control through the automatic pilot during flight, the elevator control channel of the autopilot may be controlled manually through the control stick 86 at which time, if the craft is in a banked turn, up elevator signals will be provided by the vertical gyroscope roll attitude operated signal generator 60 similar to that in the aforesaid Perkins application. On the other hand, if the aircraft be flown either on Mach control or constant altitude control as evident by the selector position and during either of these two modes, no signal is supplied to the summing conductor 33 through the lagged pitch rate circuit comprising potentiometer 53, but on the other hand the pitch attitude stabilizing signal is derived instead from the pitch attitude potentiometer 102. At this time also no signal is supplied from the up elevator signal generator 60 to conductor 33.

The above mentioned configuration of the elevator channel is provided by a function or mode selector arrangement 170, FIGURE 2. This selector arrangement includes a manually positionable function selector 171 having three operable positions M, R and A. In the M position of the selector, the craft while responsive to the automatic pilot is under an outer loop Mach control; with the selector in the R position the craft is under basic pitch rate or normal control; and in the A position of the selector, the craft is under an outer loop constant altitude control. The selector 171 through suitable operating means 172 positions two single pole-double throw switch arms 173, 174. With the selector in the R or normal position, at which time Mach control is not selected, switch arm 173 coacts with a selector unoperated contact 175 and switch arm 174 coacts with selector unoperated contact 177. In the M position of the selector, switch arm 173 coacts with a contact 176 and switch arm 174 engages with contact 178. The selector 171 through suitable operating means 179 operates in the altitude selected position to position switch arms 180 and 181 into engagement with contacts 183 and 185 respectively. When selector 171 is in other than the altitude position, the switch arms 180 and 181 coact with unoperated contacts 182, 184. Spring means 188 may be used also with respect to switch arms 173, 174, 180, and 181 to bias them to unoperated position.

Associated with the selector arrangement 170 are six solenoid operated relays. They are the altitude control relay K-8; the pitch control stick steering relay K-11; the Mach control K-12; the Mach-altitude relay K-30; one pitch mode selector relay K-40, and a further pitch mode selector relay K-41.

Relay K-8 comprises out contact $m$ and in or relay energized contacts $n$, $o$, $p$, and $q$. The relay includes an operating winding 191 which operates a member or armature 192 whereby movable arms may disengage the relay out contact and engage the relay in contacts.

The pitch control stick steering relay K-11 comprises out contact $d$ and relay energized in contacts $e$ and $f$. The relay includes an operating winding 194 which causes its armature 195 to adjust movable relay arms whereby the out contact is disengaged and the in contacts are engaged.

The Mach control relay K-12 comprises relay unenergized or out contact $t$ and relay energized or in contacts $v$, $w$, $x$, and $y$. The relay includes an operating winding 197 which operates an armature 198 connected to operable relay arms whereby the out contact is disengaged and the in contacts are engaged.

The K-30 or Mach-altitude control relay comprises an out contact $a$ and relay energized or in contacts $b$ and $c$. The relay includes an operating winding 200 which operates an armature 201 which in turn moves adjustable relay arms to disengage the out contact and engage the in contacts.

Pitch mode selector relay K-40 comprises an out contact $g$ and an in contact $z$. The relay includes an operating winding 202 for adjusting armature 203 engaged with relay arms so that the out contact $g$ is disengaged and the in contact $z$ is engaged. The relay winding 202 is shunted by a capacitor 204 which constitutes part of a time delay as will be brought out more fully hereinafter.

Pitch mode selector relay K-41 comprises three out contacts $h$, $j$ and $k$. The relay includes an operating winding 205 which operates a member 206 for adjusting three relay arms whereby the three out contacts are disengaged on energization of winding 205.

Associated with the operating winding 191 of the K-8 relay is an operating winding 208 for an electromagnetic clutch for the altitude controller whereby the altitude sensing device 145 is connected to its altitude displacement potentiometer 143. The winding 208 may be selectively energized prior to introducing altitude control as will be described hereinafter. The magnetic clutch winding 208 and the altimeter arrangement may be similar to that disclosed in the Rossire Patent 2,512,902 wherein the magnetic clutch winding 47 corresponds with winding 208 herein.

Also associated with the operating winding 197 of the Mach control relay K-12 is a magnetic clutch operating winding 212 for connecting a Mach sensor 122 with the Mach displacement potentiometer 126. The clutch winding 212 may be selectively energized as will be disclosed more fully hereinafter. Devices for sensing the Mach pressure of an aircraft are known in the prior art, and it is contemplated merely to operate the Mach signal potentiometer through a magnetic clutch from such Mach sensor.

Associated with the selector 171 is a manually operable single pole, single throw switch 214 for connecting a battery or supply 215 to the selector. A similar switch 251 is associated with a circuit of the K-40 relay operating winding 202.

Having completed the disclosure of the elevator channel, reference will be made to FIGURE 1B which shows the aileron and rudder channels of the autopilot, which coact with the elevator channel, in block form. In FIGURE 1B, an aileron surface 220 of the airframe is positioned by the output member 221 of an aileron servomotor 222 similar to the elevator servomotor 7. Servo 222 is controlled by an aileron servo control system 224 similar to the network 19, inverter 94, amplifier 17, and torquer 12 that control the elevator servo 7. The servo control 224 is responsive, among several control factors, to the operation of a vertical gyroscope 225 which senses craft bank attitude, a servo displacement feedback or follow-up 226 driven by the output member 221 of servo 222 and a roll control stick steering input 227 from the operation in a lateral direction in the craft of the control stick 86 FIGURE 1A.

Also associated with the aileron servo control 224 is a bank synchronizer 228 which at times functions in the nature of a signal repeater as more fully disclosed in the aforesaid Perkins application. The relationship of the bank synchronizer 228 and the vertical gyroscope 225 is as follows: when the roll attitude is not being controlled by the control stick 86 FIGURE 1A, the output of the vertical gyroscope 225 FIGURE 1B is supplied directly through an operable two position switch means 229 in its horizontal position to the aileron servo control 224. However, when the banked attitude is controlled by the control stick 86, by means of the suitable switching arrangement the output of the vertical gyroscope 225 is supplied through the switch means 229 as shown in FIGURE 1B to the bank synchronizer 228. The bank synchronizer 228 operates and supplies a feedback over conductor 230 to an electrical differential summing means 231. Thus the synchronizer 228 is operated in accordance with the bank attitude of the craft.

Additionally after the craft is at the desired bank, the output of the bank synchronizer is selectively supplied over conductor 232 and single throw switch 213 to the aileron servo control 224. When through the control stick 86 the aircraft has been placed in a desired banked attitude and the control stick returned to normal position, the output of the vertical gyroscope 225 is supplied directly to the aileron servo control but the desired bank signal is supplied by the synchronizer 228. The aircraft will be maintained in the banked attitude selected by means of a differential signal from the vertical gyroscope 225 directly into the servo control 224 and the bank synchronizer input through switch 213 and conductor 232 to servo control 224.

The rudder control 234 FIGURE 1B comprises a rudder surface 235 of the aircraft positioned by the output member 236 of a rudder servomotor 237. Servo 237 is controlled by a rudder servo control 238. The servo control 238 controls the servo 237 through the control means 239. The servo control and servo are similar to the corresponding elements in the elevator channel. The servo control receives control effects from an aileron control surface position member 240, and a rudder servo feedback 241. While additional control elements may be provided for the servo control, the two recited are sufficient for an understanding of the invention.

*Operation*

The aircraft is presumed to be airborne and to have been placed upon a desired heading with the craft also in level position about its lateral and about its longitudinal axes. The control networks for the aileron, rudder and elevator channels such as the network 19 FIGURE 1A are assumed to be in balanced condition prior to engaging the autopilot and the aircraft.

To facilitate placing the aircraft manually on a desired heading as well as aligning it laterally and longitudinally, a valve for each servomotor such as valve 250 in the elevator servo 7 may be opened to permit substantially free operation of the associated control surface such as the elevator control surface directly from manually operable means as the control stick 86.

When the craft is properly aligned in heading and attitude such valves may thereafter be closed. After the bridge networks corresponding to network 19 of the elevator channel have been placed in balance condition, which balance may be detected by any suitable indicating means, switch 214 FIGURE 2 may be closed, and the selector 171 may be placed in its normal or R position. Bridge supply conductors 36 and 37 may be connected to the bridge supply 78 by closing switches 76 and 77. Switch 251 which is of the single pole single throw type may also be closed.

With the selector now in the R or normal position relays K–11, K–41 are energized none of the four relays, K–8, K–12, K–30, K–40 are energized. With switch 214 closed, closing switch 251 completes a circuit from battery 215, switch 214, conductor 254, conductor 255, resistor 252, switch 251, and relay winding 202 and capacitor 204 in parallel, to ground and return to battery 215. After a predetermined time interval after the switch 251 has been closed determined by capacitor 204, the capacitor becomes charged and the relay winding 202 is energized causing its armature 203 to disengage the $g$ contact and engage the $z$ contact. The opening of contact $g$ opens the circuit for the operating winding 205 of the pitch mode of selector relay K–41.

The aircraft is now stabilized in roll attitude by the vertical gyroscope 225, FIGURE 1B. The aircraft is stabilized about its lateral or pitch axis by the pitch rate gyroscope which supplies direct inputs to control the network 19 and also provides a lagged rate input through lag network comprising resistors 58, 56 and capacitor 57.

If desired, the aircraft may be manually placed in a banked turn by the operation of the control stick 86 which operation is preceded by placing the single pole double throw switch 229 FIGURE 1B in the position shown and opening bank synchronizer switch 213. With the aircraft in a banked turn as provided by the operation of the pilot's control stick 86, with the selector 171 still in normal or R position, up elevator signals are provided by network 60 FIGURE 1A in response to the roll attitude of the craft sensed by the vertical gyroscope 70 to prevent loss of altitude in the banked turn. While the aircraft is so banked, switch 213 is closed and switch 229 is moved to direct connect gyro 225 to servo control 224 and the bank attitude and synchronizer signals differentially control the aileron servo.

The aircraft may be controlled about its pitch axis by the operation of the pilot control stick 86 through the pitch control stick steering potentiometer 83 relays contacts $e$, $f$ and conductor means extending from slider 84 to the summing conductor 33 of network 19.

The aircraft may be placed in the Mach mode configuration by adjusting the function selector 171 to the M position. With selector 171 in the Mach position, a previously made circuit extends from closed switch 214, conductor 254, conductor 255, resistor 252, switch 251, capacitor 204 and relay winding 202, to ground, which operated relay K–40. A second newly made circuit extending from switch 214, conductor 257, function selector arm 174, selector contact 178, conductor 258, conductor 259, conductor 260, in contact $z$ of relay K–40, conductor 261, conductor 262, operating winding 197 of the Mach control relay K–12 to ground energizes relay K–12. Additionally a parallel circuit from conductor 262 to winding 212 of the magnetic clutch operatively connects Mach sensor 122 with potentiometer slider 127. With relay winding 197 energized the armature 198 causes the arms of the relay K–12 to engage their in contacts, $v$, $w$, $x$, and $y$ and to be disengaged from out contact $t$. The $y$ contact provides a holding circuit from energized conductor 259, conductor 263, contact $y$, conductor 264, conductor 262, windings 197 and 212 to ground. Opening contact $t$ opens the circuit of operating winding 194 of relay K–11.

The in contact $x$ of relay K–12 provides a shunting circuit from energized conductor 255, conductor 266, relay contact $x$, conductor 267 to ground, thereby short circuiting operating winding 202 of the K–40 relay which drops to its out position whereby relay contact $g$ thereof is engaged and contact $z$ is disengaged.

Relay winding 197 as stated remains energized through the holding circuit over conductor 263. Relay contact $w$ FIGURE 1A when closed enables the Mach control signal to be supplied through conductor 134 to summing conductor 33. The pitch mode selector relay K–41 is energized through the $g$ contact from energized conductor 255, conductor 269, relay contact $g$, conductor 270, operating winding 205, to ground. With the closed contact $k$ FIGURE 1A disengaged, capacitor 138 becomes charged with the Mach control signal. Capacitor 138 constitutes a time delay or fade in arrangement for the Mach control signal supplied to terminal 111 and thence to network conductor 33. Relay K–12 contact $v$ completes a circuit from energized conductor 254, conductor 271, conductor 272, conductor 273, relay contact $v$, conductor 274, conductor 275, operating winding 200 of the K–30 relay to ground. The K–30 relay disengages its $a$ contact and closes its $b$ and $c$ contacts. Opening contact $a$ and closing contact $c$ FIGURE 1A permits the pitch attitude signal from potentiometer 102 to be supplied through high pass condenser 109 and resistor 110 to summing conductor 33 of network 19. Closing of contact $b$ connects the voltage on slider 54 to signal ground to bypass and render ineffective the lagged rate signal from the pitch rate gyroscope 50. Thereby, while on Mach control short period stabilization is provided by a signal from the vertical gyroscope 105 rather than from the lagged pitch rate signal.

The control stick 86 may be operated to place the aircraft in a banked turn while under Mach control. The placing of the aircraft in the banked turn may cause a variation in the speed or Mach number to be maintained. The Mach sensor 122 will provide a control signal tending to reestablish and maintain a selected Mach for the aircraft and cause the aircraft if necessary to change attitude about its pitch axis. Since the vertical gyro 105 has its potentiometer 102 connected to summing conductor 33 through the capacitor 109 which transmits merely transient pitch attitude disturbances of fairly high frequency to conductor 33, a longer period and thus lower frequency pitch attitude signal arising because of the change in pitch attitude required to maintain the constant Mach of the aircraft will not be transmitted, thus the aircraft may assume a changed angle of attack required to maintain the desired Mach of the craft.

If the function selector 171 be now placed in the R or normal position, the Mach control relay K–12 has its operating winding 197 open circuited at selector contact 178 and is thus deenergized. With relay contact $x$ of the K–12 relay disengaged, the capacitor 204 associated with operating winding 202 of the K–40 or pitch mode selector relay becomes charged and after a time interval the relay winding 202 operates. Before this time period has expired, the K–30 or Mach-altitude relay will have had its operating winding 200 open circuited at in contact $v$ of the relay K–12. The K–30 relay out contact $a$ of FIGURE 1A connects potentiometer slider 107 to signal ground preventing any transmission of pitch attitude signals to summing conductor 33 and, with K–41 relay contact $k$ open during the time interval, the Mach control signal on capacitor 138 is slowly discharged to the summing conductor 33 of the network 19 to fade out the Mach control signal. Similarly the pitch attitude signal capacitor 113 is faded out. At this time, before passage of the time period, the pitch mode selector relay K–1 as implied is energized through the out contact $g$ of the deenergized K–40 relay.

After the time interval has expired and relay winding 202 of relay K–40 is energized, the contact $g$ is disengaged to deenergize the pitch mode selector relay K–41 and contacts $j$ and $k$ thereof short their respective capacitors 113 and 138 to effect a rapid discharge of these condensers.

Also the opening of contact $b$ fo relay K–30, previously stated as deenergized, permits the resumption of lagged pitch rate pitch attitude control. Thus lagged pitch rate signals and pitch control stick steering signals may be applied to conductor 33 through the lagged pitch network comprising resistors 58, 56 and capacitor 57, since relay K–11 is reenergized through out contact $t$ of the Mach control relay 12.

If the selector 171 now be placed in the altitude position, an eventual steady state is reached wherein relays K–11, K–12, K–40 will be out but K–8, K–30, K–41 will be in. Upon selecting altitude control a relay energizing circuit is completed from energized conductor 257, function selector arm 174, selector contact 177, conductor 277, selector arm 180, selector contact 185, conductor 278, conductor 279, out contact $h$ of relay K–41, conductor 280, relay operating winding 191 of the altitude control relay K–8 to ground and also in parallel with winding 191 through clutch winding 208 to ground whereby the altitude sensor 145 is connected to slider 142 of the altitude control potentiometer 143.

With winding 191 energized, shunting circuit for winding 202 of the K–40 relay is provided from energized conductor 281, relay contact $o$, conductor 282, to ground. Relay winding 202 becomes deenergized and relay contact $g$ is closed and relay contact $z$ is opened. With contact $g$ closed, the K–41 relay is energized from a circuit comprising energized conductor 255, conductor 269, relay contact $g$, conductor 270, operating winding 205, to ground. Relay contacts $j$ and $k$ are disengaged to open the quick discharge path for their capacitors 113 and 138 to permit the capacitors to charge and thus effect fade in of the two control signals attitude and altitude associated therewith.

Returning to the K–38 relay, a holding circuit for operating winding 191 is completed from energized conductor 278, relay contact $q$, conductor 283, winding 191, to ground. Relay contact $m$ deenergizes the pitch control stick steering relay K–11 by interrupting a circuit therefor comprising energized conductor 271, conductor 285, relay contact $m$, conductor 286, relay contact $t$ of the Mach control relay K–12, conductor 287, operating winding 194 of relay K–11 to ground. With relay K–11 deenergized, relay contact $d$ is engaged and relay contacts $e$ and $f$ are disengaged preventing the transmission of the pitch control stick steering signal on potentiometer 83 to terminal 52 or to voltage dividing potentiometer 118 and additionally grounding the resistor of voltage dividing potentiometer 118 through contact $d$ to signal ground.

K–8 relay contact $n$ completes a relay energizing circuit from energized conductor 272, conductor 288, relay contact $n$, conductor 290, conductor 275, operating winding 200 of the K–30 relay, to ground. Relay contacts $a$, $b$ and $c$ reintroduce short period pitch attitude stabilization from the vertical gyroscope 105 and prevent the application of the pitch rate signal from gyro 50 to resistors 58 and 56 by connecting potentiometer slider 54 to signal ground to ground the lag circuit of the pitch rate gyro. The in contact $p$ of the K–8 relay on energization of the relay connects the altitude control potentiometer 143 through resistor 135 to summing point 111 and thence to the summing conductor of the network. Constant altitude of the aircraft through the altitude sensor operated potentiometer 143 is maintained.

If the craft be placed in a banked turn by operation of the control stick 86, at which time the switch 229 FIGURE 1B is placed in the position shown in the figure and switch 213 is opened as shown the bank synchronizer 228 will be monitored to the bank attitude of the craft sensed by the vertical gyro 225. After the craft has attained its desired banked attitude at which time the control stick is recentered, the switch 229 is placed in horizontal position and switch 213 is closed to directly apply the output of vertical gyro 225 and the bank synchronizer to the aileron servo control 224. While the aircraft is thus under a banked attitude, and should it tend to lose altitude while thus banked, the altitude sensor 145 will apply an altitude error signal to the network 19. Since the aircraft is in a steady state banked turn, the vertical gyroscope 105 which merely applies transient pitch attitude changes to summing conductor 33 will permit the long period and therefore low frequency change in pitch attitude. Thus an attitude change or change in angle of attack as may be necessary to maintain constant altitude is effected.

When the function selector 171 is returned to its normal or R position, the holding circuit for relay winding 191 and clutch winding 208 is opened when function selector arm 180 disengages selector contact 185. Deenergizing clutch winding 208, enables the altitude displacement potentiometer recentering means, such as spring 291, to recenter slider 142 relative to resistor 144.

The K–11 or control stick steering relay has its operating winding 194 energized from battery 215, switch 214, conductor 254, conductor 271, conductor 285, relay out contact $m$ of relay K–8, conductor 286, out contact $t$ of the K–12 relay, conductor 287, operating winding 194 of the K–11 relay to ground, to disengage contact $d$ and engage contacts $e$ and $f$ to reestablish circuits to the network summing conductor 33 from the pitch control stick steering potentiometer 83.

The circuit for the operating winding 200 of the K–30 or Mach-altitude relay is opened at relay contact $n$, whereby in contacts $b$ and $c$ are disengaged and in contact $a$ is engaged thereby disconnecting the vertical gyro pitch attitude potentiometer 102 from summing contactor 33 and connecting the same to signal ground while the opening of contact $b$ permits the reinstitution of lagged pitch rate attitude control.

With relay contact $o$ disengaged, the winding 202 and capacitor 204 are no longer shunted to ground. The capacitor 204 begins to charge consequently at this time the winding 202 does not operate.

Contact $p$ now disengages the altitude sensor potentiometer 143 from terminal 137. During the charging period of capacitor 204 during which the relay operating winding 202 is not operating, the operating winding 205 of the K–41 or pitch mode selector relay is energized throughout contact g of relay K–40 whereby out contacts h, j, and k are disengaged. At this time, the signals that are stored in capacitor 113 and capacitor 138 discharge through the summing conductor 33 and thus through the network 19.

After capacitor 204 is fully charged, relay winding 202 is fully energized to disengage contact g and engage contact z. Disengaging contact g deenergizes the pitch mode selector K–41 so that relay contacts h, j, and k are reengaged and through closed contacts j and k the capacitors 113 and 138 are discharged to signal ground without going through the network 19.

The aircraft is now restored to normal or lagged pitch rate control. It may be controlled about either its longitudinal or pitch axes by operation of the control stick 86. Stabilization about the roll or pitch axes may be provided in one case by the bank attitude gyroscope 225, FIGURE 1B or through the lagged pitch rate control in the pitch axis in FIGURE 1A.

With the function selector as stated in the normal or R position, banked turns which are effected through the control stick 86 include the up elevator network 60 FIGURE 1A as the source of compensation signal in the elevator channel to prevent loss of altitude of the craft while at such banked turns.

It will now be apparent that there has been provided a novel aircraft pitch axis control configuration utilizing high-passed or high frequency pitch attitude control signals but eliminating low frequency pitch attitude control signals. Eliminating the low frequency signals during the period when the craft is in a banked turn while under altitude or Mach control permits the change in craft angle of attack or craft pitch attitude necessary to maintain the outer loop values of constant altitude or constant Mach. The arrangement utilizing high passed pitch attitude control and insert in banked turns avoids the apparent pitch up sensed by rate gyro 50 and dispenses with the need for a separate source of up elevator control signal and enables the altitude control to be determined by the outer loop altitude sensor.

While one embodiment of the invention has been disclosed, it is apparent that changes in the component arrangement and in the components themselves may be effected without departing from the spirit of the invention:

What is claimed is:

1. In an automatic pilot for an aircraft, said aircraft having first attitude changing means operable to place a craft in a banked turn and second attitude changing means operable to vary the pitch attitude of the craft, in combination; motor means for said automatic pilot operating said second attitude changing means; control means connected to said motor means; a balanceable voltage network operating said control means on unbalance thereof; a pitch rate signal voltage generator; a lag device connecting said rate signal generator and network for control thereof; a pitch attitude responsive signal generator; a pressure responsive signal generator; means rendering said rate signal generator and lag device ineffective to control said network and connecting said pressure responsive signal generator to said network; and further means connecting said pitch attitude generator with said network, said further connecting means including frequency responsive means for transmitting only transient pitch attitude deviations to said network, whereby during banked turns of the craft, steady state or long period and thus low frequency changes in craft attitude may be effected by said pressure responsive generator without opposition by said attitude signal generator.

2. The apparatus of claim 1, wherein the pressure responsive signal generator is primarily responsive to changes in craft altitude.

3. The apparatus of claim 1, wherein the said pressure responsive signal generator is primarily responsive to the speed of the aircraft.

4. In an automatic pilot for an aircraft having control means operable to vary the pitch attitude of the craft, in combination: motor means in said automatic pilot operating said control means; operating means connected to said motor means; a balanceable voltage network actuating said operating means on unbalance thereof; a pitch rate signal voltage generator; a lag device connecting said generator and network for control thereof to provide short period pitch attitude stabilization of said craft; a pitch attitude responsive signal generator; a pressure responsive signal generator; additional means rendering said rate signal generator ineffective to control said network and connecting said pressure responsive signal generator to said network; and further means responsive to said additional means connecting said pitch attitude signal generator with said network, said further connecting means including frequency responsive means for only transmitting transient pitch attitude deviations to said network, whereby steady state or long period changes in craft attitude may be effected by said pressure responsive generator without opposition by said attitude signal generator.

5. In an automatic pilot for an aircraft having first control means operable to place the craft in a banked turn and second control means operable to vary the pitch attitude of the craft, in combination: motor means in said automatic pilot operating said second control means while the craft is in a banked turn; operating means connected to said motor means, a balanceable voltage network controlling said operating means on unbalance thereof; a pitch rate signal generator; means connecting said signal generator to said network and transmitting only transient signals therefrom to said network for control thereof; a lag device additionally connecting said pitch rate generator and network; a pitch attitude responsive signal generator; a pressure responsive signal generator; additional means disabling said rate signal generator and lag device from controlling said network and connecting said pressure responsive signal generator to said network; and further connecting means responsive to operation of said additional means and connecting said pitch attitude generator with said network, said further connecting means including frequency responsive means for transmitting only transient high frequency pitch attitude deviations to said network, whereby during banked turns steady state or long period and therefore low frequency changes in craft attitude may be automatically effected by said pressure responsive generator without opposition by said pitch attitude signal generator.

6. In an automatic pitch axis control apparatus having motor means operating an elevator surface for an aircraft said apparatus having a control stick steering mode and a constant pressure mode of control the combination comprising: means for supplying a signal varying with the force on the control stick of the aircraft; pitch rate responsive means for supplying a signal in accordance with the pitch rate of the craft; means for deriving a displacement signal in accordance with the deviation in pitch attitude of said craft from a reference attitude; means connected thereto and energized thereby for supplying a signal in accordance with the rate of change of said attitude displacement signal; means for supplying a signal in accordance with the deviations in pressure with respect to a desired pressure; a mode selector having a plurality of selective positions; means controlled by one position of said selector for operating said control apparatus motor means from said control stick force signal and pitch rate signals; and further means responsive to a second position of said selector for disabling said control stick and pitch rate signals from control of said apparatus and controlling said apparatus motor means from said attitude rate signal and said pressure responsive signal, whereby steady state or long period changes in craft pitch attitude may be effected by said pressure responsive generator without opposition by said pitch attitude signal generator.

7. Control apparatus for an aircraft having motor means for operating an elevator control surface for controlling the craft about its pitch axis, said apparatus comprising: control means including a balanceable D.C. signal voltage network operating said motor means on unbalance of said network; a first or pitch rate signal generator, a second or motor displacement signal generator, means connecting said pitch rate and motor displacement signal generators to said network including time element means for transmitting only transient pitch rate and motor displacement signals to said network; a third or control stick effort signal generator, a fourth or pitch attitude signal generator; a fifth or pressure responsive signal generator; a two position selector means; and further means controlled by said selector means and connecting said third, fourth and fifth generators to said network for additionally controlling said network from either said control stick generator or said pitch attitude and pressure responsive signal generators, said further means including frequency responsive connecting means between said pitch attitude signal generator and said network whereby steady state or long period and therefore low frequency changes in craft attitude may be effected by said pressure responsive generator without opposition by said pitch attitude signal generator.

8. In an aircraft having first control surfaces operable to place the craft in a banked turn and second control surfaces to vary the pitch attitude of the craft in combination: first motor means operating said first control surfaces; aircraft control stick responsive signal providing means for operating said first motor means from said signal to place the craft in a banked turn; second motor means operating said second or pitch attitude control surface, second operating means connected to said second motor means; a balanceable voltage, pitch attitude control network operating said second operating means on unbalance thereof; a control stick effort signal generator, a pitch rate signal generator; means for connecting said two signal generators to said network for control thereof; a pitch attitude gyroscope responsive signal generator; a craft flight pressure responsive signal generator; operable means rendering ineffective said rate signal generator and control effort signal generator from controlling said network and connecting said pressure responsive signal generator to said network; and further connecting means connecting said pitch attitude generator with said network, said further connecting means including frequency responsive means for transmitting only transient pitch attitude deviations from said attitude gyroscope responsive generator to said network whereby during banked turns, steady state or long period and therefore low frequency changes in craft attitude may be effected by said pressure responsive generator to compensate for decrease in vertical lift due to said banked turn without opposition by said attitude gyroscope signal generator.

9. The apparatus of claim 8, wherein said pitch attitude control network is additionally controlled through said operable means by a signal generator responsive to the roll attitude of the craft when said network is controlled by said control effort and pitch rate signal generators.

10. The apparatus of claim 9 wherin the network is a direct voltage summing network and said generator signals are direct voltage of reversible polarity.

11. The apparatus of claim 8 wherein the network is of a direct voltage parallel summing type and said generated signals are of the direct voltage reversible polarity type.

12. The apparatus of claim 11 wherein said time element means for transmitting only transient pitch attitude deviations to said network comprise a capacitor element in series with said pitch attitude signal generator.

13. The apparatus of claim 12 wherein the pitch rate signal generator is connected to said network through a capacitor in series therewith thereby transmitting only transient pitch rate disturbances from said pitch rate signal generator to said network.

14. The apparatus of claim 11 wherein the pressure responsive signal generator senses the airspeed of the craft.

15. In an automatic pilot for an aircraft having an elevator control surface controlling craft attitude about its pitch axis, in combination: motor means operating the elevator surface; control means operating the motor means; a balanceable voltage network connected to the control means and operating said control means on unbalance thereof; an altitude responsive signal voltage generator; a pitch attitude change signal voltage generator; a motor means operated displacement signal generator; means connecting said three signal generators to said network, said connecting means including frequency responsive means between the attitude signal generator and network transmitting only transient or high frequency pitch attitude change signals to said network from said attitude signal generator, whereby steady state departures of attitude of the craft from level position may be effected without opposition from said attitude signal generator, to maintain constant altitude of the craft.

16. Aircraft control apparatus comprising: first means providing a direct signal voltage corresponding in polarity and magnitude to the sense and magnitude of departure of said craft from a predetermined altitude; second means providing a direct signal voltage corresponding in polarity and magnitude to the sense and magnitude of departure of said craft from a predetermined attitude in pitch; third means connected to the first and second means combining said signal voltages; and attitude changing means comprising a servo means responsive to said combining means for changing the attitude of said craft in pitch to return said craft to said predetermined attitude and altitude, said combining means including capacitor means arranged for transmitting only high frequency or transient pitch attitude departure signals and all frequency altitude signals to said servo means, whereby steady state departure of attitude of the craft from the predetermined attitude may be effected to maintain constant altitude of the craft.

17. In an automatic pilot for an aircraft said aircraft having first control means operable to place the craft in a banked turn and second control means operable to vary the pitch attitude of the craft, in combination: motor means of said automatic pilot operating said second control means while the craft is in a banked turn; operating means connected to said motor means; a balanceable voltage network connected to said operating means and controlling said operating means on unbalance thereof; a pitch rate signal voltage generator; a lag device connecting said pitch rate generator and said network for control thereof; a pitch attitude displacement responsive signal generator; a flight path responsive signal generator; means disabling said lag device from controlling said network and connecting said flight path responsive signal generator to said network; and further means connecting said pitch attitude displacement generator with said network, said further means including signal variation rate responsive means for transmitting only transient pitch attitude deviations to said network, whereby during banked turns steady state or long period changes in craft pitch attitude may be effected by said flight path responsive generator without opposition by said attitude signal generator.

18. Control apparatus for an aircraft having motor means operating pitch attitude changing means of said craft for controlling craft attitude about said pitch axis, said apparatus comprising: a balanceable, parallel summing, direct voltage network operating said motor means on unbalance of said network; a first signal generator responsive to operation of said motor means; a second signal generator responsive to angular pitch rate of said craft; a control stick third signal generator; means for connecting said three signal generators into said balanceable network including a common lag network connecting both said pitch rate signal generator and said stock signal generator to said network; first relay means including first operable switch means in operated position rendering said lag network ineffective to supply said rate signal and said control stick signal to said network; a fourth signal generator responsive to change in pitch attitude of said craft; additional connecting means, including means transmitting only transient pitch attitude disturbances and first relay operated second switch means in series, from said fourth signal generator to said network; a charging circuit, for storing a signal voltage, connected between a point of said second switch means and balanceable network said former point having the greater potential and a null point of said network; a normally open rapid first discharge circuit for said charging circuit; a selector movable to either of two positions; and time delay means controlled by the first relay means and effective when said selector is moved from one position wherein the first relay operated switch means is effective to render said lag network ineffective, said second switch mean operated and said rapid discharge circuit ineffective to the other position wherein said first relay means is effective to move both first and second said operated switch means to ineffective position, to permit slow discharge through said charging connection of said network and thereafter through the time delay means render said rapid discharge circuit effective and said lag network effective, all whereby the attitude signal on said charging connection effects a slow change in craft attitude as determined by the fourth generator which is thereafter maintained by said lagged pitch rate signal.

19. Control apparatus for an aircraft having motor means for operating an elevator control surface for controlling the craft about its pitch axis, said apparatus comprising: control means including a balanceable D.C. signal network operating said motor means on unbalance of said network; a first signal generator means responsive to craft attitude; a first capacitor extending therefrom; a first relay means; connecting means including a portion of said energized first relay means extending between said capacitor and network; a second capacitor connecting said portion of the relay means to signal ground; a normally open shunting or discharge circuit for said second capacitor comprising a resistor and a portion of a second relay means; a second signal generator responsive to craft altitude; means including a second portion of the energized first relay means connecting said second signal generator into said network; a third capacitor connecting said second portion of the first relay means to signal ground; a normally open shunting circuit for said third capacitor comprising a second resistor and a second portion of said second relay means and effectively shunting said third capacitor on de-energization of said second relay means; a selector having two positions; and time delay means effective when the selector is moved from one position wherein the first relay means is energized to a second position where the first relay means is de-energized to enable said second and third capacitors to discharge initially through said network at a slow rate, subsequently de-energizing said second relay means so that said capacitors are discharged through their resistors at a rapid rate, and thereafter effecting re-energization of the second relay means to effect reopening of the shut circuits for said second and third capacitors to effect the gradual decreasing control effect of said first and second signal generators on said network.

20. Control apparatus for an aircraft having motor means operating a control surface for controlling craft attitude about an axis, said apparatus comprising: a balanceable D.C. voltage network operating said motor means on unbalance of said network; a first signal voltage generator responsive to a first condition of said craft namely change in attitude about said axis; a first means including a high pass connection extending from said signal generator to said network to transmit only transient attitude change effects; a charging connection from said first means to signal ground for storing a signal voltage; a normally open rapid first discharge circuit for said charging connection; a second signal generator responsive to a second condition of craft flight; second means connecting said second signal generator to said network; a second charging connection from said second connecting means to signal ground; a second normally open rapid discharge circuit for said second charging connection; a selector having two positions; and time delay means effective when the selector is moved from one position wherein the first connecting means and second connecting means are effective to complete their connections to a second position wherein the first and second means are ineffective to complete their connections, to maintain the rapid discharge circuits open to enable said capacitors to discharge initially through said network at a slow rate and, thereafter to close both rapid discharge circuits for both charging connections, and thereafter reopening both rapid discharge circuits for both charging connections, to effect a decreasing control from said first and second signal generators in said network; and a third signal generator responsive to the craft rate of change of attitude additionally unbalancing said network.

21. Control apparatus for an aircraft having motor means operating an elevator control surface for controlling craft pitch attitude, said apparatus comprising: a balanceable D.C. voltage network operating said motor means on unbalance of said network; a first signal voltage generator responsive to operation of said motor means; a second signal voltage generator responsive to craft pitch rate; means connecting said two signal voltage generators into said network; a third signal voltage generator responsive to craft change in pitch attitude; connecting means between said third signal generator and said network comprising a capacitor and first operated switch means in series relationship; a capacitor type charging connection from said network to signal ground; a normally open rapid discharge circuit for said charging connection comprising a resistor and second switch means in series relationship; and means for moving said first switch means to unoperated position to isolate said third signal voltage generator from said network to permit slow discharge of said charging connection through said network; and further means for operating said second switch means to effect more rapid discharge of said charging connecting, all whereby the pitch attitude signal on said charging connection decreases its effect on said network.

22. Control apparatus for an aircraft having motor means operating pitch attitude control means of said craft for controlling craft attitude about said pitch axis, said apparatus comprising: a balanceable parallel summing D.C. network operating said motor means on unbalance of said network; a first signal generator responsive to operation of said motor means; a second signal generator responsive to pitch rates; means for connecting the two signal generators into said network; a lag network additionally connecting said pitch rate signal generator into said network; first relay means rendering said lag network ineffective to supply said additional rate signal to said network; a third signal generator responsive to change in pitch attitude; additional connecting means including a high pass capacitor and operated switch means in series from said third signal generator to said network; a charging circuit from said additional connecting means to signal ground; a normally open rapid first discharge circuit for said charging circuit; a selector movable to two positions; and time delay means effective when said selector is moved from one to the other position, the first relay means in the one position being effective to render said lag network ineffective and said rapid discharge circuit ineffective and in the other position said first relay being effective to move said operated switch means to unoperated position to permit slow discharge through said charging connection of said network and thereafter render said rapid discharge circuit effective and said lag network effective, all whereby the attitude signal on said charging connection effects a slow change in craft attitude as determined by the generators which is thereafter maintained by said lag pitch rate signal.

23. Control apparatus for an aircraft, said apparatus operating pitch attitude control means of said craft, said apparatus comprising: motor means operating said surface; a balanceable D.C. summing network operating said motor means on unbalance of said network; a first signal generator responsive to said motor means; a second signal generator responsive to craft angular pitch rate; means connecting said two signal generators into said network; a third signal generator responsive to change in craft pitch attitude; transmitting means including operated switch generator to said network; a charging connection comprising a capacitor from said transmitting means to signal ground of said network; a normally open first discharge circuit from the transmitting means to signal ground for said charging connection; means for moving the operated switch means to unoperated position said switch means being between said third generator and charging connection to isolate said third signal generator from said network whereby said charging connection discharges through said network to "fade out" said signal from the third signal generator; and means for operating said switch means to shunt said charging connection whereby no lag effect is introduced on the pitch rate signal in said network by said charging connection.

24. Control apparatus for an aircraft having motor means operating an elevator control surface for controlling craft pitch attitude, said apparatus comprising: a balanceable D.C. voltage network operating said motor means on unbalance of said network; a first signal voltage generator responsive to operation of said motor means; a second signal voltage generator responsive to craft pitch rate; means connecting said two signal voltage generators into said network; a third signal voltage generator responsive to craft change in pitch attitude; connecting means between said third signal generator and said network comprising a capacitor and first operated switch means in series relationship for transmitting only transient pitch attitude changes of said craft; a capacitor type charging connection from said switch means to signal ground; a normally open rapid discharge shunt circuit for said charging connection comprising a resistor and second switch means in series relationship; and means for moving said first switch means to unoperated position to isolate said third signal generator from said network and charging connection to permit slow discharge of said charging connection through said network; and further means for operating said second switch means to effect more rapid discharge of said charging connection, all whereby the pitch attitude signal on said charging connection decreases its effect on said network; and additional means connecting said isolated third signal generator to signal ground.

25. In an aircraft control apparatus comprising an elevator to control pitch attitude and motor means operating said elevator, in combination: first sensing means producing a direct signal voltage of variable magnitude corresponding to extent of departure of said craft from a predetermined altitude; second sensing means producing a direct signal voltage of variable magnitude corresponding to extent of departure of said craft from a predetermined attitude; third means including a network controlling the motor means for combining voltages; means for connecting said two signal producing means to said network, said connecting means for said pitch attitude signal producing means being a series circuit including signal frequency responsive means for transmitting only transient or high frequency pitch attitude deviations to said network, whereby a steady state or long period and thus low frequency change in craft attitude may be effected by said altitude signal without opposition by said attitude signal producing means.

26. In automatic flight control apparatus for an aircraft said apparatus having alternatively either pitch attitude or control stick steering modes of operation, said apparatus comprising first means for supplying a signal in accordance with the effort applied to said control stick; second means for deriving a signal in accordance with the deviations in attitude of said aircraft from a referenced attitude; third means connected to said second means and passing high frequency changes in said attitude signal; a motor means controlling craft pitch attitude; control means operating said motor means; switch means connecting said first and third means to said control means and selectively controlling said control means either from said control stick effort signal or said attitude signal as passed by said third means; and means connected with said third means and effective during control of said control means from said control stick effect signal for nulling the signal varying with the attitude deviation passing through said third means for nulling the output of said third means whereby the signal from said third means upon change in position of the switch means may be gradually introduced to said control means.

27. The apparatus of claim 26, with means providing a signal in accordance with the altitude of the craft and means for connecting said altitude signal to said control means during operation of said control means from said attitude rate signal from said third means whereby steady state or long period changes in craft pitch attitude may be effected by said altitude signal without opposition by said pitch attitude signal.

28. Attitude control apparatus for an aircraft having a control surface comprising, a servomotor operating said surface; gyroscopic attitude means for developing a first control signal voltage variable in magnitude in accordance with extent of angular displacement of said aircraft from a predetermined referenced attitude; follow-up means responsive to operation of said servomotor and having a displacement magnitude corresponding to control surface displacement from a streamlined position for developing a second signal voltage in accordance with said displacement; signal combining network means connected for operating said servomotor; means connecting said signal voltage from both signal developing means in opposing summing relation in said network means, said connecting means including signal variation rate responsive means solely between said attitude means and network thereby eliminating non-transient or nonvariant attitude signals.

References Cited in the file of this patent

UNITED STATES PATENTS

| | | |
|---|---|---|
| 2,368,673 | Metcalf | Feb. 6, 1945 |
| 2,429,642 | Newton | Oct. 28, 1947 |
| 2,446,567 | White | Aug. 10, 1948 |
| 2,615,658 | Young | Oct. 28, 1952 |
| 2,632,142 | Chenery | Mar. 17, 1953 |
| 2,644,941 | Kellogg | July 7, 1953 |
| 2,683,004 | Alderson et al. | July 6, 1954 |
| 2,770,429 | Schuck et al. | Nov. 13, 1956 |
| 2,775,124 | Gardner et al. | Dec. 25, 1956 |